United States Patent [19]
Fukuda et al.

[11] Patent Number: 5,417,872
[45] Date of Patent: May 23, 1995

[54] LUBRICANT COMPOSITION, REFRIGERATION APPARATUS CONTAINING SAME AND PROCESS FOR OPERATING THE APPARATUS

[75] Inventors: Katsumi Fukuda, Tochigi; Tadashi Iizuka, Ashikaga; Reishi Naka, Tochigi; Hiroaki Hata, Tochigi; Masahiko Gommori, Tochigi; Yoshiharu Homma, Hitachi, all of Japan

[73] Assignee: Hitachi, Ltd., Tokyo, Japan

[21] Appl. No.: 32,663

[22] Filed: Mar. 17, 1993

Related U.S. Application Data

[62] Division of Ser. No. 762,601, Sep. 19, 1991, abandoned.

[30] Foreign Application Priority Data

Jan. 30, 1991 [JP] Japan ................... 3-009721
Apr. 30, 1991 [JP] Japan ................... 3-098845

[51] Int. Cl.⁶ ............................................. C02F 5/02
[52] U.S. Cl. ................... 252/68; 252/52 R; 252/56 R; 252/56 S; 252/52 A
[58] Field of Search .............. 252/68, 52 R, 56 R, 252/56 S, 52 A

[56] References Cited

U.S. PATENT DOCUMENTS

| | | | |
|---|---|---|---|
| 2,852,470 | 9/1958 | Henne et al. | 252/68 |
| 4,248,726 | 2/1981 | Uchinuma et al. | 252/52 A |
| 4,267,064 | 5/1981 | Sasaki et al. | 252/52 A |
| 4,435,338 | 3/1984 | Michaelis et al. | 554/78 |
| 4,454,052 | 6/1984 | Shoji et al. | 252/68 |
| 4,851,144 | 7/1989 | McGraw et al. | 252/52 A |
| 4,900,463 | 2/1990 | Thomas et al. | 252/54 |
| 4,916,914 | 4/1990 | Short | 62/84 |
| 4,944,890 | 7/1990 | Deeb et al. | 252/54 |
| 5,032,305 | 7/1991 | Kamakura | 252/67 |
| 5,096,606 | 3/1992 | Hagihara | 252/68 |

*Primary Examiner*—Prince Willis, Jr.
*Assistant Examiner*—James M. Silbermann
*Attorney, Agent, or Firm*—Antonelli, Terry, Stout & Kraus

[57] ABSTRACT

A lubricant composition comprising as a base oil one or more ester oils, alkylbenzene oils and mineral oils, and a glycidyl ether compound having at least two epoxy groups is miscible in hydrofluorocarbon and hydrochlorofluorocarbon refrigerants such as R134a, etc. as replacing refrigerants of R12 and provides a stable operation of refrigeration compressor for a long period of time without causing corrosion and wear of a sliding portion of the compressor.

6 Claims, 1 Drawing Sheet

LUBRICANT COMPOSITION, REFRIGERATION APPARATUS CONTAINING SAME AND PROCESS FOR OPERATING THE APPARATUS

This application is a Divisional application of application Ser. No. 762,601, filed Sept. 19, 1991, now abandoned.

BACKGROUND OF THE INVENTION

This invention relates to a lubricant composition miscible in hydrofluorocarbon and hydrochlorofluorocarbon refrigerants and a process for using such a lubricant composition in refrigerator compressors and refrigerator compressor built-in refrigeration apparatus. More particularly, the present invention relates to a lubricant composition which is less deteriorated when contacted with a refrigerant in refrigerators at relatively high temperatures and suitable for enhancing reliability of compressors and a process for using such a lubricant composition in refrigerator compressors and refrigeration apparatus containing refrigerator compressors therein.

Recently, the use of chlorofluorocarbons (CFC) is to be inhibited in order to prevent the ozone layer in the stratosphere from breakage. Such CFC's include R11 (trichloromonofluoromethane), R12 (dichlorodifluoromethane), R113, R114, R115, etc. For example, R12 which has been used in refrigeration cycle in refrigeration apparatus such as a refrigerator is an object to be inhibited. As replacing refrigerants, hydrochlorofluorocarbons (HCFC) containing one or more hydrogen atoms in the molecule such as R22, and R502 (azeotropic mixed refrigerants containing 48.8% by weight of R22 and 51.2% by weight of R115) are studied. The ozone layer breakage coefficient of R22 is 0.05 and that of R502 is 0.3 taking the ozone layer breakage coefficient of R12 as 1. In the future, a hydrofluorocarbon (HFC) containing no chlorine atom in the molecule will be employed eternally. A typical example of HFC is R134a which has the ozone layer breakage coefficient of 0, is nonflammable and has almost the same thermodynamic properties as R12. Thus, R134a can be used practically without changing remarkably the structures of refrigeration apparatus such as refrigerators and dehumidifiers and refrigerator compressors. However, R134a ($CH_2FCF_3$) has very unique properties due to its special chemical structure, so that it is not miscible in refrigerating machine oils used in the refrigeration system of R12, e.g. mineral oils (naphthenic oils, paraffinic oils) and synthetic oils such as alkylbenzene. Thus, there arise various problems in that oil return becomes worse when the oil flows into the refrigeration system, resulting in retaining the oil in the heat exchanger to lower heat transfer ability, and in the worst case, the oil in the compressor becomes insufficient so as to cause seizing or abnormal wear on sliding portions due to poor lubrication. Therefore, development of refrigerating machine oils (or lubricants for refrigerants) suitable for refrigerant R134a is required.

As the lubricants having miscibility in R134a, there are proposed polyglycol oils (e.g. Japanese Patent Unexamined Publication Nos. 1-259093, 1-259094, 1-259095, etc.) and ester oils (e.g. Reito vol. 65, no. 756, pp 47–52 (Oct. 1990)). But the polyglycol oils have defects in that (i) hygroscopicity large (saturated water absorption rate: 10,000–30,000 ppm), (ii) electric insulating resistance is low (volume resistivity: $10^{12}$ Ω·cm or less), and (iii) deterioration by oxidation is great. In the case of using a hermetic compressor wherein a motor which is a driving source is integrated, there is a fear of lowering insulating properties of motor coils and terminals, resulting in causing a problem in reliability. On the other hand, in the case of the ester oils, there can be obtained improvement in electric insulating properties (volume resistivity: $10^{12}$ Ω·cm) and hygroscopicity (saturated water absorption rate: 1,000–5,000 ppm) compared with the polyglycol oils, but the hygroscopicity is still larger than the saturated water absorption rate of 50–100 ppm of mineral oils and alkylbenzenes, which are refrigerating machine oils used in the R12 system and hydrolysis of ester oils is inevitable from their molecular structures. Thus, when an ester oil having a high water content is used as a refrigerating machine oil, the ester oil is hydrolyzed to form an organic acid near sliding portions of the compressor wherein the temperature becomes highest in the refrigeration system, resulting in increasing the total acid value of the refrigerating machine oil. As a result, there take place corrosion or damage of sliding materials of the compressor, formation of copper plating, reduction of moving of the sliding portions (e.g. abnormal increasing of the torque to rotate a shaft) due to formation of a viscous metallic soap, blocking of capillary tube in the refrigeration cycle. Thus, long period reliability of compressors and refrigeration apparatus is remarkably damaged. Improvement of this is desired.

On the other hand, addition of epoxy compounds to refrigerating machine oils is also proposed. For example, addition of an alkylene oxide compound to mineral oils or synthetic oils to improve thermal stability of CFCs is proposed (Japanese Patent Unexamined Publication No. 57-10694). In this reference, it is stated that styrene oxide and phenyl glycidyl ether cannot be used due to high toxicity and extremely strong skin irritation, epoxidized soy bean oil is low in thermal stability and shows a tendency to form a sludge freed from the oil in the co-presence of CFC refrigerator, and contrary to these compounds, special alkylene oxide compounds are low in toxicity and able to improve thermal stability of refrigerators. But refrigerants used in working examples are only R12, the use of which is to be inhibited. There is no description as to replacing refrigerants or as to what effects can be expected by using the alkylene oxide compounds. In fact, effects of the alkylene oxide compounds against R134a are insufficient.

Further, there is proposed a refrigerating machine oil obtained by adding a glycidyl ester of a straight-chain or side-chain saturated fatty acid having 8 to 18 carbon atoms or straight-chain unsaturated fatty acid having 14 to 18 carbon atoms to a polyhydric alcohol ester or a mixture of polyhydric alcohol ester and a mineral oil or synthetic oil (Japanese Patent Unexamined Publication No. 62-292895). In this reference, it is stated that the addition of glycidyl ethers such as phenyl glycidyl ether, epoxidized fatty acid esters, epoxidized vegetable oils, glycidyl acrylate, etc. is not preferable due to strong skin irritation in some cases, low effects, or the like, and addition of long-chain alcohol glycidyl ether (having one epoxy group) undesirably causes a phenomenon of copper plating, corrosion of copper, etc. But even if an effective fatty acid glycidyl ester is used under severe conditions of high temperatures, an acidic substance formation reaction due to hydrolysis of fatty acid glycidyl ester and an acid catching reaction by the glycidyl group proceed simultaneously, so that an acid catching effect as a whole is reduced. Thus, metallic parts of the compressor are damaged due to corrosion and wear with non-caught acidic substance, resulting in blocking of passage of refrigerant in a refrigeration apparatus by metallic reaction product of fatty acid and causing a problem of lowering performance due to lack of cooling.

Further, in the refrigeration cycle using R22 or R502 as a refrigerant and a mineral oil or alkylbenzene as a refrigerating machine oil, copper plating takes place on the surface of sliding portions of compressor, resulting in providing a problem of reliability of compressor.

SUMMARY OF THE INVENTION

It is an object of the present invention to provide a lubricant composition (a refrigerating machine oil composition) miscible in hydrofluorocarbon and hydrochlorofluorocarbon refrigerants which are replacing refrigerants of R12 and excellent in thermal stability and wear resistance overcoming the problems mentioned above. It is another object of the present invention to provide a process for using such a lubricant composition in a refrigerant compressor and a refrigeration apparatus including therein such a refrigerant compressor.

The present invention provides a lubricant composition miscible in hydrofluorocarbon and hydrochlorofluorocarbon refrigerants comprising as a base oil at least one member selected from the group consisting of ester oils, alkylbenzene oils and mineral oils, and a glycidyl ether compound having at least two epoxy groups.

The present invention further provides a process for using such a lubricant composition in a refrigerant compressor or in a refrigeration apparatus including therein such a refrigerant compressor.

DESCRIPTION OF THE PREFERRED EMBODIMENTS

Figure 1:
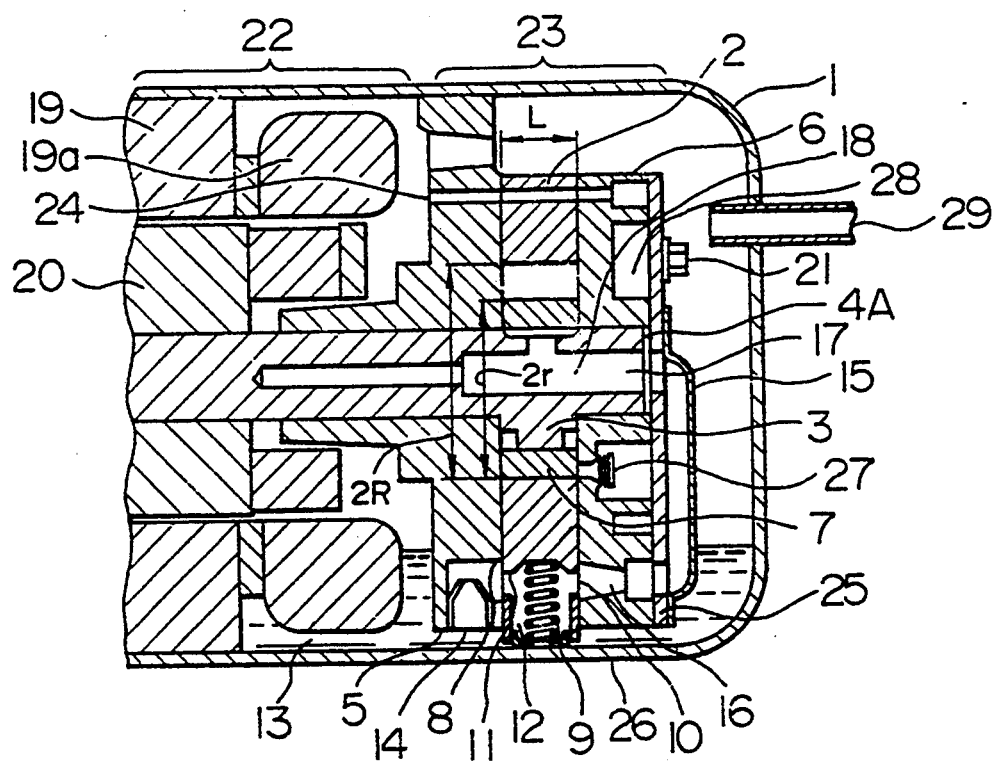
FIG. 1 is a cross-sectional front view of essential portion of a hermetic rotary refrigerant compressor.

The present inventors have noticed that the epoxy compounds added to refrigerating machine oils have only one epoxy group, so that the desired effect has not been obtained, and accomplished the present invention.

As the base oil in the lubricant composition, there is used at least one member selected from the group consisting of ester oils, alkylbenzene oils and mineral oils. Particularly, as the ester oils, it is preferable to use hindered ester oils obtained by esterification reaction of an organic (fatty) acid with a polyhydric alcohol, and complex ester oils obtained from a polyhydric alcohol, a polybasic acid and an organic (fatty) acid, alone or as a mixture thereof.

As the glycidyl ether compounds, there is used that having two or more epoxy groups. Such a glycidyl ether compound has no toxicity unlike phenyl glycidyl ether and shows no skin irritation, so that it is safe for handling.

Preferable glycidyl ether compounds include, for example, alkylene glycol diglycidyl ethers and aliphatic cyclic epoxy compounds.

Preferable examples of the alkylene glycol diglycidyl ethers are represented by the formulae:

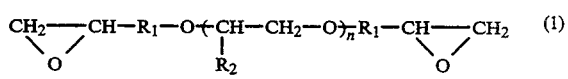

wherein $R_1$ is an alkylene group preferably having 1 to carbon atoms; $R_2$ is a hydrogen atom or an alkyl group preferably having 1 to 5 carbon atoms; and n is an integer of 1 to 22,

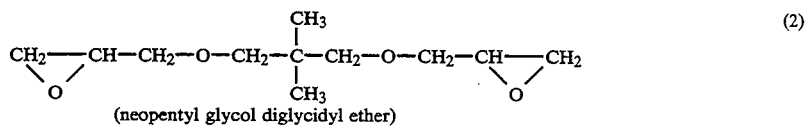

(neopentyl glycol diglycidyl ether)

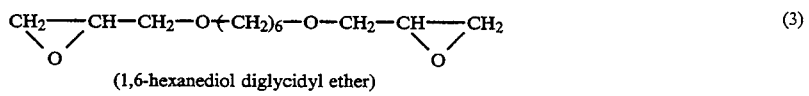

(1,6-hexanediol diglycidyl ether)

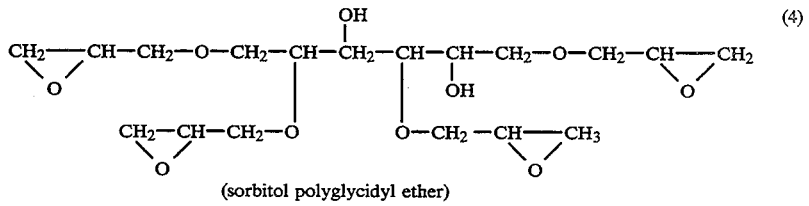

(sorbitol polyglycidyl ether)

Among the compounds of the formula (1), those having $CH_2$ as $R_1$ and H or $CH_3$ as $R_2$ and represented by the formulae (6) and (7) are particularly preferable:

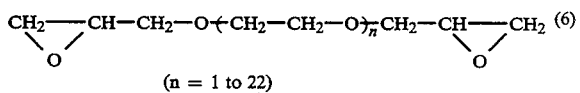

(n = 1 to 22)

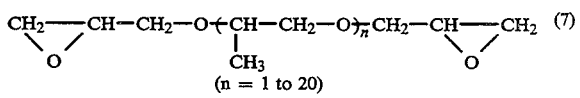

(n = 1 to 20)

Preferable examples of the aliphatic cyclic epoxy compounds are 3,4-epoxycyclohexylmethyl(3,4-epoxy)-cyclohexane carboxylate of the formula:

an inter-ring epoxy compound represented by the formula:

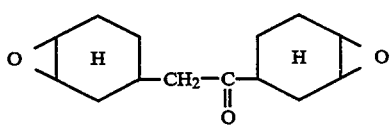

an inter-ring epoxy and glycidyl ether compound of the formula:

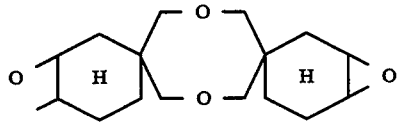

a glycidyl ester compound of the formula:

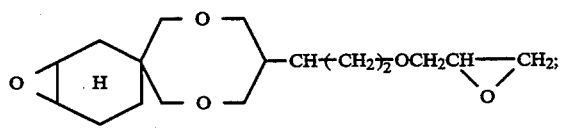

a hydantoin compound of the formula:

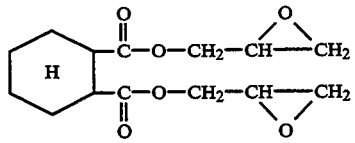

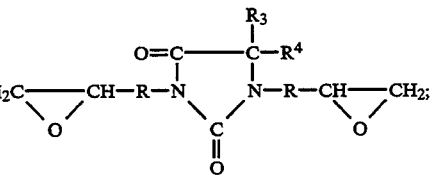

wherein R is an alkyl group having preferably 1 to 5 carbon atoms; and $R_3$ and $R_4$ are independently a hydrogen atom or an alkyl group having preferably 1 to 5 carbon atoms.

The glycidyl ether compound used in the present invention is characterized by having at least two epoxy groups in the molecule. For example, the glycidyl ether compound have a better effect in acid catching than epoxy compounds having only one epoxy group such as 2-ethylhexyl glycidyl ether or glycidyl 2-ethylhexanoate.

The acid catching effect (an effect of removing a harmful acid produced by hydrolysis of ester oil) of various epoxy compounds (1.0% by weight in a lubricant composition) was tested and listed in Table 1.

In a glass test tube having an inner diameter of 10 mm, 5 ml of an oil containing 1.0% by weight of an epoxy compound to be tested having a water content of 700 ppm was placed and metallic pieces of iron, copper and aluminum were also placed, followed by sealing of the test tube. After heating at 175° C. for 336 hours, the test tube was opened and the total acid number of the oil and corrosion state of the metallic pieces were measured.

The total acid number was measured by the testing method for neutralization number of petroleum products (JIS K2501).

The corrosion state of the metallic pieces were tested by observing the state of floating or precipitated products produced by corrosion in the oil and surface state of the metallic pieces totally. The evaluation was made as follows:

⊙ No corrosion
○ Almost no corrosion
Δ Slightly corroded
X Clearly corroded

TABLE 1

| | Epoxy compound | Total acid number (mg KOH/g) | Corrosion of metals | Note |
|---|---|---|---|---|
| Glycidyl ethers | Propylene glycol diglycidyl ether[1] | 1.0 | ○ | * |
| | 2-Ethylhexyl glycidyl ether[2] | 1.4 | Δ | |
| | Neopentyl glycol diglycidyl ether[3] | 1.0 | ○ | * |
| | Phenyl glycidyl ether[4] | 0.65 | ⊙ | Strong irritation on the skin |
| | Isostearyl glycidyl ether (long-chain alcohol glycidyl ether) | 1.30 | Δ | |
| Fatty acid cyclic epoxides | 3,4-Epoxy cyclohexylmethyl(3,4-epoxy)-cyclohexane carboxylate[5] | 0.61 | ⊙ | *No irritation on the skin |
| | Cyclohexene epoxide[6] | 0.30 | ⊙ | Low ignition point |
| | Epoxidized linseed oil | 1.50 | Δ | |
| | Glycidyl 2-ethyl-hexanoate[7] | 1.42 | Δ | |
| (Reference) | | | | |
| | Ester oil (no addition of epoxy | 2.0 | X | |

TABLE 1-continued

| Epoxy compound | Total acid number (mg KOH/g) | Corrosion of metals | Note |
|---|---|---|---|
| compound) | | | |

Note)
*Epoxy compounds used in the present invention.
Note on Table 1:

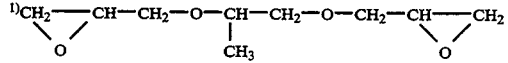

1) $CH_2\text{—}CH\text{—}CH_2\text{—}O\text{—}CH\text{—}CH_2\text{—}O\text{—}CH_2\text{—}CH\text{—}CH_2$ with epoxy groups and $CH_3$ substituent 2) $CH_2\text{—}CH\text{—}CH_2\text{—}O\text{—}CH_2\text{—}CH\text{—}(CH_2)_3\text{—}CH_3$ with epoxy group and $CH_3$ substituent 3) $CH_2\text{—}CH\text{—}CH_2\text{—}O\text{—}CH_2\text{—}C(CH_3)(CH_3)\text{—}CH_2\text{—}O\text{—}CH_2\text{—}CH\text{—}CH_2$ with epoxy groups 4) Phenyl—O—$CH_2$—CH—$CH_2$ with epoxy group 5) Dicyclohexyl structure with epoxy groups linked by $CH_2$—O—C(=O)

6) Cyclohexene oxide

7) $CH_3(CH_2)_3\text{—}CH\text{—}C(=O)\text{—}CH_2\text{—}CH\text{—}CH_2$ with $CH_3CH_2$ substituent and epoxy group As is clear from Table 1, the glycidyl ether compounds used in the present invention are excellent in the acid removing effect and have no irritation on the skin.

As mentioned above, by adding the glycidyl ether having at least two epoxy groups to a base oil containing one or more ester oils, alkylbenzene oils and mineral oils, alone or as a mixture thereof, an organic acid produced by hydrolysis in the case of ester oils is catched by the epoxy group to control the increase of total acid number, resulting in preventing corrosion and wear of sliding material of the compressor, the phenomenon of copper plating and the production of metallic soap and maintaining normal performance of the compressor. More concretely, when an ester oil is hydrolyzed, an organic acid and an alcohol are produced. When there are epoxy groups, the epoxy groups are opened to catch the organic acid. Such a reaction scheme can be represented by the following equation (14).

$$R_6\text{—}\overset{O}{\overset{\|}{C}}\text{—}O\text{—}CH_2\text{—}\overset{R_5}{\underset{R_5}{C}}\text{—}CH_2\text{—}O\text{—}\overset{O}{\overset{\|}{C}}\text{—}R_6 + 2H_2O \longrightarrow \quad (14)$$
(hindered ester)

$$R_6\text{—}COOH + HO\text{—}CH_2\text{—}\overset{R_5}{\underset{R_5}{C}}\text{—}CH_2\text{—}OH +$$
(acid)  (alcohol)

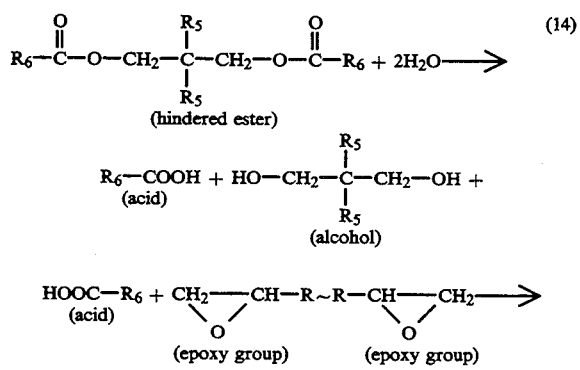

HOOC—$R_6$ + $CH_2$—CH—R~R—CH—$CH_2$ ⟶
(acid)    (epoxy group)    (epoxy group)

-continued

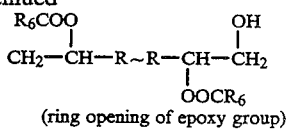

$R_6COO \qquad\qquad OH$
$CH_2\text{—}CH\text{—}R\text{~}R\text{—}CH\text{—}CH_2$
$\qquad\qquad\qquad\qquad OOCR_6$
(ring opening of epoxy group)

In the case of a combination of an alkylbenzene oil, mineral oil and a hydrochlorofluorocarbon refrigerant, the refrigerant reacts with the oils under severe conditions to form hydrochloric acid, which produces corrosion and wear of sliding material, and copper plating phenomenon. In such a case, the epoxy group opens to catch the hydrochloric acid to maintain the normal performance of the compressor. Such an effect can be admitted in the case of using an epoxy compound having only one epoxy group, but the effect is by far greater when the glycidyl ether compound having at least two epoxy groups is used.

The glycidyl ether compound having at least two epoxy groups can be used preferably in an amount of 0.05 to 10% by weight, more preferably 0.1 to 1.0% by weight, based on the weight of the lubricant composition. When the amount is less than 0.05% by weight, the acid catching effect is insufficient, while when the amount is more than 10% by weight, there is a tendency to damage the functions of the base oil as a refrigerating machine oil and to lose a practical value.

When propylene or polypropylene glycol diglycidyl ether or 3,4-epoxycyclohexylmethyl(3,4-epoxy)cyclohexane carboxylate is used as the glycidyl ether compound having at least two epoxy groups, it is also used in an amount of preferably 0.05 to 10% by weight, more preferably 0.1 to 1% by weight, based on the weight of the lubricant composition.

The lubricant composition of the present invention may contain one or more antioxidants, extreme-pressure additives, anti-foaming agents, etc., so long as not damaging the objects of the present invention.

As the antioxidants, it is effective to use phenolic compounds. In order to prevent change of properties and deterioration of the base oil and to maintain durability of the base oil, the positive addition of phenolic compounds is preferable. The antioxidant is added preferably in an amount of 0.01 to 5% by weight based on the weight of the lubricant composition.

Preferable examples of the phenolic antioxidant are represented by the formulae (8) and (9):

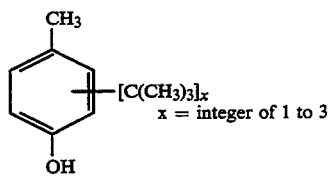

(8)

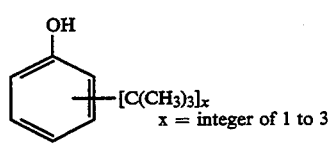

(9)

As the refrigerant used in the refrigerant compressor and the refrigeration apparatus, those having a critical temperature of 40° C. or higher are preferable.

Examples of hydrofluorocarbon refrigerants having a critical temperature of 40° C. or higher are difluoromethane (R32), pentafluoroethane (R125), 1,1,2,2-tetrafluoromethane (R134), 1,1,1,2-tetrafluoroethane (R134a), 1,1,2-trifluoroethane (R143), 1,1,1-trifluoroethane (R143a), 1,1-difluoroethane (R152a), monofluoroethane (R161), etc.

Examples of hydrochlorofluorocarbon refrigerants having a critical temperature of 40° C. or higher are dichloromonofluoromethane (R21), monochlorodifluoromethane (R22), monochloro-1,2,2,2-tetrafluoroethane (R124), 1-chloro-1,1,2,2-tetrafluoroethane (R124a), pentafluoroethane (R125), 1-chloro-1,1-difluoroethane (R142b), an azeotropic mixture (R502) of monochlorodifluoromethane (R22) and monochloropentafluoroethane (R115), etc.

Among them, R134, R134a, R143 and R143a are preferable as replacing refrigerants of R12, since these refrigerants have boiling points near the boiling point of R12. Further, R22 and azeotropic mixture R502 (a mixture of R22 and R115) have the ozone layer breakage coefficient of not zero, but are practically used today, thus can effectively be used as a replacing refrigerant of R12 in a short time.

These hydrofluorocarbons and hydrochlorofluorocarbons can be used alone or as a mixture thereof.

The critical temperature of 40° C. or higher is required, because the refrigeration apparatus requires the condensing temperature of 40° C. or higher in the condenser.

The lubricant composition is used as a lubricating oil in a compressor wherein a refrigerant cycles and is compressed. As the compressor, there can be used rotary type, reciprocating type, screw type, and scroll type compressors. Such a compressor, for example, comprising a closed vessel containing a refrigerating machine oil at the lower portion therein, and housing therein a motor comprising a rotor and a stator, a rotating shaft fixed on the rotor, a compressing means connected to the motor via the rotating shaft, and at least one refrigerant selected from hydrofluorocarbons and hydrochlorofluorocarbons having a critical temperature of 40° C. or higher, said refrigerating machine oil being the lubricant composition mentioned above.

According to the present invention, even if the hydrofluorocarbon or hydrochlorofluorocarbon refrigerant is used under considerably high temperatures, since the reaction between the base oil and the refrigerant or the base oil and water is inhibited, the refrigerant compressor can be operated in a sufficiently stable state. Thus, the refrigeration apparatus including such a refrigerant compressor can also be operated stably. Such a refrigeration apparatus comprises the compressor mentioned above, a condenser, an expansion means, an evaporator, and pipes for connecting these devices and cycling the refrigerant.

Such a refrigeration apparatus can be used as household electrical appliance such as a refrigerator, dehumidifier, air conditioner, etc.; various commercial refrigeration apparatus equipped with refrigeration cycle used in show cases and beverage storing places as well as refrigeration apparatus requiring refrigeration cycle such as automative air conditioners and package-type large-sized air conditioners.

The present invention is illustrated by way of the following Examples, in which all parts and percents are by weight unless otherwise specified.

EXAMPLES 1 TO 10,

Comparative Examples 1 to 3

The lubricant compositions as listed in Table 2 were subjected to a test of thermal stability for refrigerant. The results are shown in Table 2.

The thermal stability for refrigerant was tested as follows. In a test tube made of pressure glass and having an inner diameter of 6 mm and a thickness of 2 mm, 0.5 ml of a sample oil (with or without additive) was placed and metallic pieces of iron, copper and aluminum as a catalyst were also placed, followed by addition of 0.5 ml of a refrigerant while cooled with dry ice and sealing of the test tube. The test tube was heated at 175° C. or 200° C. for 960 hours. After heating, the color of the mixture of oil and refrigerant in the test tube was measured comparing with the ASTM standard colors to evaluate the degree of progress of the chemical reaction between the oil and the refrigerant.

Further, the degree of copper plating phenomenon wherein copper is deposited on the surface of iron pieces was observed by the naked eye and evaluated by 5 steps, that is, (+) slight copper plating to (5+) copper being plated on whole surfaces of iron pieces.

In addition, the presence of deposit produced by the chemical reaction between the oil and refrigerant was also evaluated.

As is clear from Table 2, the lubricant composition comprising hindered ester oil and propylene/polypropylene glycol diglycidyl ether of the formula (7) (Epoxy ①) added in an amount of 0.25% (Example 1) and the lubricant composition comprising hindered ester oil and 3,4-epoxycyclohexylmethyl (3,4-epoxy)cyclohexane carboxylate (Epoxy ②) added in an amount of 0.25% (Example 2) are slight in color change of the base oil and no copper plating and no deposit are formed in the presence of R134a. In contrast, in Comparative Example 1 containing no additive, copper plating and deposit are undesirably formed. Thus, the stability for refrigerant is remarkably improved in Examples 1 and 2.

In Examples 3 to 6 wherein Epoxy ① and Epoxy ② are added to alkylbenzene oil and naphthenic mineral oil, copper plating and deposit are not formed in the presence of R22. This means that the stability for refrigerant is improved clearly compared with Comparative Examples 2 and 3.

Further, in Examples 7 to 10 wherein 2,6-di-tert-butyl para-cresol (DBPC) of the formula (8) is added in an amount of 0.25% as an antioxidant, the thermal stability for refrigerant is further improved compared with the cases of simply adding Epoxy ① or Epoxy ②. The phenolic antioxidant of the formula (9) also showed the same effects as the phenolic compound of the formula (8) (the results are not shown in Table 2).

EXAMPLES 11 TO 17,

Comparative Examples 4 and 5

The lubricant compositions as listed in Table 3 were subjected to a hydrolysis test as follows.

In a test tube made of pressure glass and having an inner diameter of 10 mm and a thickness of 2 mm, 5 ml of a sample oil having a water content of 3000 ppm was placed and metallic pieces of iron, copper and aluminum were placed, followed by addition of 2 ml of the refrigerant R134a while cooled with dry ice and sealing of the test tube. The test tube was heated at 150° C. for 7 and 21 days. After heating, the color of a mixture of the oil and the refrigerant and the degree of copper plating were evaluated. Then the test tube was sealed and subjected to the measurement of total acid number of the oil-refrigerant mixture according to the testing method for neutralization number of petroleum products (JIS K2501).

The results are shown in Table 3.

TABLE 2

| Example No. | Base oil | Viscosity (cst at 40° C.) | Additive* | Refrigerant | Test temp. (°C.) | Color of oil (ASTM) | Copper plating** | Deposit |
|---|---|---|---|---|---|---|---|---|
| Example 1 | Hindered ester oil | 32 | Epoxy ① | R134a | 175 | 0.5 | None | None |
|  |  |  |  |  | 200 | 1.5 | " | " |
| Example 2 | Hindered ester oil | 32 | Epoxy ② | R134a | 175 | 0.5 | " | " |
|  |  |  |  |  | 200 | 1.5 | " | " |
| Example 3 | Alkylbenzene | 60 | Epoxy ① | R22 | 200 | 0.5 | " | " |
| Example 4 | " | 60 | Epoxy ② | R22 | 200 | 0.5 | " | " |
| Example 5 | Naphthenic mineral oil | 56 | Epoxy ① | R22 | 200 | 1.0 | + | " |
| Example 6 | Naphthenic mineral oil | 56 | Epoxy ② | R22 | 200 | 1.0 | + | " |
| Comparative Example 1 | Hindered ester oil | 32 | None | R134a | 175 | 0.5 | + | None |
|  |  |  |  |  | 200 | 2.0 | 3+ | Yes |
| Comparative Example 2 | Alkylbenzene | 60 | None | R22 | 200 | 0.5 | 3+ | None |
| Comparative Example 3 | Naphthenic mineral oil | 56 | None | R22 | 200 | 1.0 | 3+ | " |
| Example 7 | Hindered ester oil | 32 | Epoxy ① DBPC | R134a | 175 | 0.5 | None | None |
|  |  |  |  |  | 200 | 1.0 | " | " |
| Example 8 | Hindered ester oil | 32 | Epoxy ② DBPC | " | 175 | 0.5 | " | " |
|  |  |  |  |  | 200 | 0.5 | " | " |
| Example 9 | Hindered ester oil | 15 | Epoxy ① DBPC | " | 175 | 0.5 | " | " |
|  |  |  |  |  | 200 | 0.5 | " | " |
| Example 10 | Hindered ester oil | 15 | Epoxy ② DBPC | " | 175 | 0.5 | " | " |
|  |  |  |  |  | 200 | 0.5 | " | " |

Note on Table 2:
Additive *:
Epoxy ① = propylene/polypropylene glycol diglycidyl ether (0.25%)
Epoxy ② = 3,4-epoxycyclohexylmethyl(3,4-epoxy)-cyclohexane carboxylate (0.25%)
DBPC = 2,6-di-tert-butyl para-cresol (0.25%)
Copper plating **:
Copper plating on the surface of iron pieces was evaluated by the naked eye in 5 steps:
(+) slightly copper plated to (5+) copper plated on the whole surface

TABLE 3

| Example No. | Base oil | Viscosity (cst at 40° C.) | Additive* | Tested days (days) | Total acid number (mg KOH/g) | Color of oil (ASTM) | Copper plating |
|---|---|---|---|---|---|---|---|
| Example 11 | Hindered ester oil (water: 3000 ppm) | 32 | Epoxy ① (0.25%) | 7 | 0.019 | 0.5 | None |
|  |  |  |  | 21 | 0.112 | " | " |
| Example 12 | Hindered ester oil (water: 3000 ppm) | " | Epoxy ② (0.25%) | 7 | 0.018 | " | " |
|  |  |  |  | 21 | 0.100 | " | " |
| Example 13 | Hindered ester oil (water: 3000 ppm) | 15 | Epoxy ① (0.25%) | 7 | 0.027 | " | " |
|  |  |  |  | 21 | 0.280 | " | " |
| Comparative Example 4 | Hindered ester oil | 32 | None | 7 | 0.066 | 0.5 | None |
|  |  |  |  | 21 | 0.585 | " | " |

TABLE 3-continued

| Example No. | Base oil | Viscosity (cst at 40° C.) | Additive* | Tested days (days) | Properties after heating | | |
|---|---|---|---|---|---|---|---|
| | | | | | Total acid number (mg KOH/g) | Color of oil (ASTM) | Copper plating |
| Comparative Example 5 | (water: 3000 ppm) Hindered ester oil | 15 | " | 7<br>21 | 0.056<br>0.344 | "<br>" | "<br>" |
| Example 14 | (water: 3000 ppm) Hindered ester oil | 32 | Epoxy ①<br>DBPC | 7<br>21 | 0.010<br>0.082 | 0.5<br>" | None<br>" |
| Example 15 | Hindered ester oil | " | Epoxy ②<br>DBPC | 7<br>21 | 0.010<br>0.061 | "<br>" | "<br>" |
| Example 16 | Hindered ester oil | 15 | Epoxy ①<br>DBPC | 7<br>21 | 0.010<br>0.120 | "<br>" | "<br>" |
| Example 17 | Hindered ester oil | " | Epoxy ②<br>DBPC | 7<br>21 | 0.010<br>0.096 | "<br>" | "<br>" |

As is clear from Table 3, the total acid numbers of Examples 11 and 12 are clearly lower than those of Comparative Examples 4 and 5. This clearly shows that the organic acid produced by hydrolysis of the ester oil is caught by the glycidyl ether compounds. Thus, the resistance to hydrolysis is remarkably improved by the present invention.

Further, when the phenolic antioxidant DBPC is added as shown in, Examples 14 and 17, the resistance to hydrolysis is further improved compared with the case of simply adding Epoxy ① or Epoxy ② to the base oil.

The phenolic antioxidant of the formula (9) also showed the same effects as the phenolic compound of the formula (8) (the results are not shown in Table 3).

EXAMPLES 18 TO 21,

Comparative Examples 6 and 7

The lubricant compositions as listed in Table 4 were subjected to an oxidation stability test according to JIS K2514 (method for testing oxidation stability of lubricating oils).

The results are shown in Table 4.

As is clear from Table 4, when Epoxy ① or Epoxy ② is added in an amount of 0.5%, the total acid numbers after heating are about 1/10 or less in Examples 18 to 21 compared with those of Comparative Examples 6 and 7.

This clearly shows that the lubricant compositions of the present invention are also effective for preventing oxidative deterioration.

Figure 2:
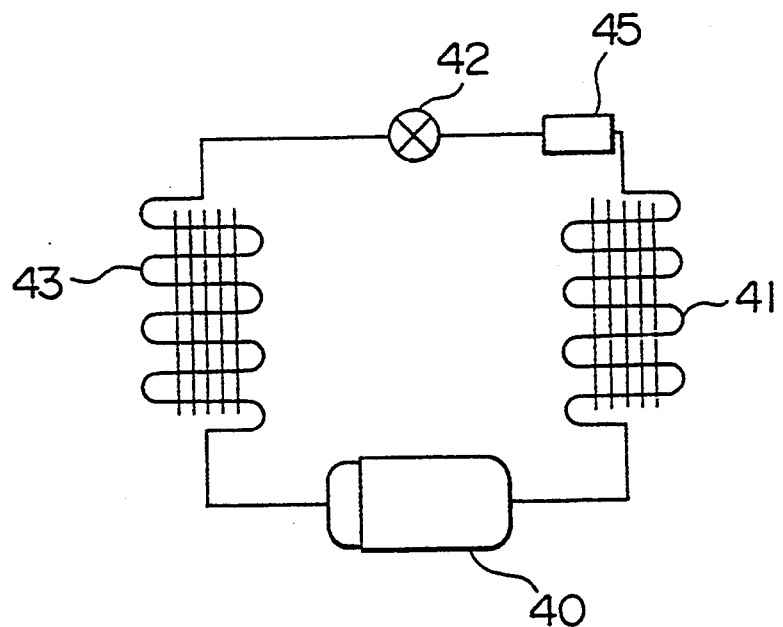
FIG. 2 is a rough view showing a refrigeration cycle in a refrigeration apparatus.

FIG. 2 is a rough view showing a refrigeration cycle in a refrigeration apparatus including the compressor of FIG. 1.

In FIG. 1, numeral 1 denotes a case which is a closed vessel usable as an oil reservoir and houses a motor portion 22 and a compressor portion 23. The motor 22 comprises a stator 19 and a rotor 20, which fixes a rotating shaft 4A. The rotating shaft 4A has an eccentric portion 3, which has a shaft hollow 17 in a vacant state at one end. A coil portion 19a of the stator 19 has coiling of magnetic wire coated with an esterimide enamel. A core portion of the stator is isolated by an electrical insulating film of polyethylene terephthalate from the coil portion. The surface of the rotating shaft 4A is finished by polishing. The compressor portion 23 comprises a cylinder 2 made of a sintered iron; a roller 7 which is inserted into the eccentric portion 3 of the rotating shaft 4A and rotates eccentrically along the inside of the cylinder 2; a vane 10 which is made of high speed steel and reciprocates in a groove 8 of the cylinder 8 while one end thereof contacts with the roller 7 and another end thereof is pushed by a spring 9; and a major bearing 5 and a secondary bearing 6 which are made of sintered iron or cast iron and form a bearing of the rotating shaft 4A and a side wall of the cylinder 2, and are positioned at both ends of the cylinder.

The secondary bearing 6 has a delivery valve 27 and covered with a delivery cover 25 so as to form a silencer 28. The major bearing 5, the cylinder 2 and the secondary bearing 6 are clinched by a volt 21. An oil pump room 12 is constituted by surrounding with the

TABLE 4

| Example No. | Base oil | Viscosity (cSt at 40° C.) | Additive | Properties after heating | | |
|---|---|---|---|---|---|---|
| | | | | Total acid number (mg KOH/g) | Color of oil (ASTM) | Copper plating |
| Example 18 | Alkylbenzene | 60 | Epoxy ① (0.5%) | 0.012 | 0.5 | None |
| Example 19 | " | 60 | Epoxy ② (0.5%) | 0.004 | 0.5 | " |
| Example 20 | Naphthenic mineral oil | 56 | Epoxy ① (0.5%) | 0.018 | 1.0 | " |
| Example 21 | Naphthenic mineral oil | 56 | Epoxy ② (0.5%) | 0.015 | 1.0 | " |
| Comparative Example 6 | Alkylbenzene | 60 | None | 0.156 | 1.0 | None |
| Comparative Example 7 | Naphthenic mineral oil | 56 | None | 0.128 | 1.5 | " |

EXAMPLE 22

FIG. 1 is a cross-sectional front view of essential portion of a hermetic rotary refrigerant compressor.

back side 11 of the vane 10, the groove 8 of cylinder 2, the major bearing 5 and the secondary bearing 6. The major bearing 5 has a suction means 14 which can suck a lubricant composition 13 reserved at the bottom of the case 1 and dissolving a refrigerant therein into the pump room 12. The secondary bearing 6 has a delivery port 16 which can deliver the lubricant composition 13 to an oil transport pipe 15 from the pump room 12. The oil transport pipe 15 feeds the lubricant composition 13 to the shaft hollow 17 of the rotating shaft 4A. The lubricant composition 13 is passed through the shaft hollow 17 and a branched hole 18 to the necessary sliding portion.

The function of the thus constituted rotary compressor is explained below.

When the compressor is operated and the cast iron made rotating shaft 4A rotates, the roller 7 made of heat treated cast iron also rotates. The high speed steel made vane 10 is pushed by the spring 9 and reciprocates in the groove 8 of cylinder 2 made of sintered iron or cast iron while contacting with the roller 7 at the end. The refrigerant flowed from a refrigerant suction inlet (not shown in FIG. 1) is compressed and delivered from a delivery pipe 29 via a refrigerant delivery outlet 24 out of the compressor. The coil portion 19a of the stator 19 and the electric insulating film (not shown in FIG. 1) are immersed in the lubricant composition dissolving the refrigerant or exposed to a circumstance formed by spraying a mist.

When the compressor was operated using the lubricant compositions shown in Examples 1-6, 11-13 and 18-21 as a refrigerating machine oil, it was able to be operated with high reliability for a long period of time even under severe conditions without damaging the sliding portion of the compressor, e.g. Without causing corrosion and seizing of bearings, and insulation failure in electric system, due to excellent thermal stability, heat resistance and resistance to oxidation deterioration of the lubricant compositions.

FIG. 2 shows a rough view of the refrigeration system in the refrigeration apparatus. In FIG. 2, numeral 40 denotes a refrigerant compressor, numeral 41 denotes a condenser, numeral 45 is a dryer, numeral 42 is an expansion means, and numeral 43 is an evaporator. As shown in FIG. 2, the refrigerant compressor 40 is charged with a lubricant composition used in Examples 1 to 21. A refrigerant gas with low temperature and low pressure is compressed, and the refrigerant gas with high temperature and high pressure is delivered and passed to the condenser 41. The refrigerant gas passed to the condenser 41 becomes a refrigerant liquid with high temperature and high pressure while releasing the heat into the air, followed by removal of water in the dryer 45. Then, the refrigerant liquid is passed to the expansion means 42 (e.g. an expansion valve or a capillary tube). The refrigerant liquid with high temperature and high pressure passing through the expansion means becomes a damp vapor with low temperature and low pressure by squeezing effect and passed to the evaporator 43. The refrigerant in the evaporator 43 absorbs heat from surroundings to evaporate. The refrigerant gas with low temperature and low pressure passed out of the evaporator 43 is suctioned into the compressor 40. The same cycle is repeated in the refrigeration apparatus.

When the refrigeration cycle mentioned above was applied to a household refrigerator, the performance of the refrigerant compressor 40 shown in FIG. 1 was exhibited to show good oil return from the evaporator to the refrigerant compressor 40 in the refrigeration cycle, resulting in realizing the refrigerator with high reliability for a long period of time with excellent durability. Good results were obtained in the life test of the refrigeration cycle.

Conditions for life test:
Motor coil temperature: 125° C.
Delivery pressure of compressor: 13 Kg/cm²G
Capillary tube in refrigeration cycle: inner diameter 0.65 mm
Refrigerant: R134a
Surrounding temperature: 40° C.
Lubricant composition: Example 7 or 9

This test corresponds to the practical operation of the refrigerator for 10 years.

Results:

No change was admitted for 90 days' operation.

In contrast, when no glycidyl ether compound was added to the lubricant compositions, deposition of metallic soap took place in the capillary tube to block the passage.

As mentioned above, the lubricant composition of the present invention shows excellent thermal stability, resistance to hydrolysis and resistance to oxidation deterioration in combination with hydrofluorocarbon and hydrochlorofluorocarbon refrigerants. Thus, such a lubricant composition is remarkably effective for maintaining the performance of the compressor for a long period of time. Thus, by installing the refrigerant compressor charged with the lubricant composition of the present invention in the refrigeration apparatus, the refrigeration apparatus with high reliability without using R12 can be realized.

What is claimed is:

1. A lubricant composition comprising as a base oil at least one member selected from the group consisting of ester oils, alkylbenzene oils and mineral oils, and an epoxy compound having at least two epoxy groups, said epoxy compound showing good acid catching effect resulting in reduced corrosion of metals and no irritation of skin.

2. A composition according to claim 1, wherein the epoxy compound is contained in an amount of 0.05 to 10% by weight based on the weight of the composition.

3. A lubricant composition comprising as a base oil at least one member selected from the group consisting of ester oils, alkylbenzene oils and mineral oils, and an epoxy compound having at least two epoxy groups, the epoxy compound being a compound of the formula:

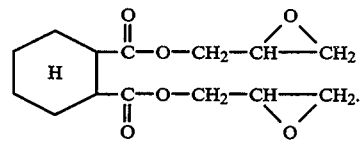

4. A lubricant composition comprising as a base oil at least one member selected from the group consisting of ester oils, alkylbenzene oils and mineral oils, and an epoxy compound having at least two epoxy groups, the epoxy compound being a compound of the formula:

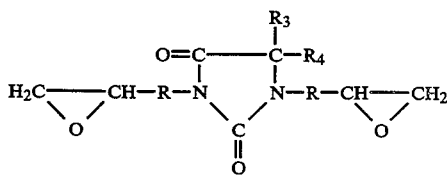

wherein R is an alkylene group having 1 to 5 carbon atoms; and $R_3$ and $R_4$ are independently a hydrogen atom or an alkyl group having 1 to 5 carbon atoms.

5. A process for operating a refrigerant compressor comprising a closed vessel containing a lubricant composition comprising as a base oil at least one member selected from the group consisting of ester oils, alkylbenzene oils and mineral oils, and an epoxy compound having at least two epoxy groups, at the bottom and housing therein a motor comprising a rotor and a stator, a rotating shaft fixed on the rotor, a compressing means connected to the motor via the rotating shaft and at least one refrigerant selected from hydrofluorocarbons and hydrochlorofluorocarbons wherein the refrigerant and the lubricant composition are compressed; said epoxy compound showing good acid catching effect resulting in reduced corrosion of metals and no irritation of skin.

6. A process for operating a refrigeration apparatus comprising a compressor, a condenser, an expansion means, an evaporator and pipes for connecting these devices and cycling a refrigerant containing the lubricant composition comprising as a base oil at least one member selected from the group consisting of ester oils, alkylbenzene oils and mineral oils, and an epoxy compound having at least two epoxy groups therethrough, said epoxy compound showing good acid catching effect resulting in reduced corrosion of metals and no irritation of skin.

* * * * *